US007404514B2

(12) United States Patent
Ackaoui

(10) Patent No.: US 7,404,514 B2
(45) Date of Patent: Jul. 29, 2008

(54) NUTRITION INDICATOR DEVICE

(76) Inventor: Alexandre Ackaoui, 2631 Steeplechase Street, Saint-Lazare, Quebec (CA) J7T 2B1

( * ) Notice: Subject to any disclaimer, the term of this patent is extended or adjusted under 35 U.S.C. 154(b) by 692 days.

(21) Appl. No.: 11/081,558

(22) Filed: Mar. 17, 2005

(65) Prior Publication Data

US 2006/0123995 A1 Jun. 15, 2006

(51) Int. Cl.
*G06C 3/00* (2006.01)
*G06K 7/00* (2006.01)
*G06K 19/00* (2006.01)

(52) U.S. Cl. ...................... 235/88 R; 235/486; 235/487

(58) Field of Classification Search ............... 235/88 R, 235/486, 487; 434/404; 40/493, 495
See application file for complete search history.

(56) References Cited

U.S. PATENT DOCUMENTS 2,592,106 A * 4/1952 Askeli ........................ 434/404
2,956,358 A * 10/1960 Pennington .................. 40/495
3,977,106 A * 8/1976 Kapp .......................... 40/495
5,173,588 A * 12/1992 Harrah ....................... 235/114
5,232,222 A * 8/1993 Deutch ................ 273/142 HA
5,640,774 A * 6/1997 Goldman .................. 33/1 SD

* cited by examiner

*Primary Examiner*—Thien M. Le
*Assistant Examiner*—April A Taylor
(74) *Attorney, Agent, or Firm*—George A. Seaby

(57) ABSTRACT

A nutrition indicator device includes a plurality of discs mounted on a pin, some of the discs being removable from the pin. Each side of each disc has an empty circular central area, and radially extending rows of numerical nutritional values for foods and the names of foods radially outwardly of such values. An opaque mask with a radially extending window is mounted on the pin for displaying the name of a single food and the nutritional values for a serving of the food when a disc below the mask is rotated to align a food name with the window.

10 Claims, 2 Drawing Sheets

NUTRITION INDICATOR DEVICE

BACKGROUND OF THE INVENTION

1. Field of the Invention

This invention relates to an informational device and in particular to a nutrition indicator device for providing nutritional information with respect to a variety of foods.

2. Discussion of the Prior Art

There are many people for whom it is important to watch their diets. Such people include diabetics and dieters. In fact, people suffering from diabetes mellitus must constantly monitor their intake of carbohydrates. Doctors and dieticians also find use for a list of foods and their nutritional values when advising patients or others. Accordingly, a need exists for some form of device for providing a quick indication of the nutritional value of foods. Our society indulges in a wide variety of foods on a regular basis. Thus, a booklet or other form of list of foods and their nutritional values could be quite bulky.

3. General Description of the Invention

The object of the present invention is to meet the above-defined need by providing a relatively simple, compact, nutrition indicator device, which, despite its small size, is adapted to carry a large quantity of information.

Accordingly, the invention relates to a nutrition indicator device comprising a pin; a plurality of discs on said pin, said discs having two sides, each of said sides having the names of foods and nutritional information for each of the foods, each food name being radially aligned with the nutritional information, the nutritional information being arranged in a plurality of concentric annular rows nearest the center of the disc, and the names of the foods being arranged in a first annular area externally of and concentric with said annular rows; a radially extending slot in at least some of said discs permitting removal of selected of said discs from the pin, whereby the food names and nutritional information on a disc beneath a removed disc can be viewed; a circular, opaque mask for covering only the nutritional information in said annular rows; an arm extending radially outwardly from said mask for covering a plurality of food names, a window extending radially of said arm a distance sufficient to expose only one food name and the nutritional information with respect to said one food, whereby, when a disc immediately beneath said mask is rotated relative to the mask, the name and nutritional information of only one food appears in said window.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
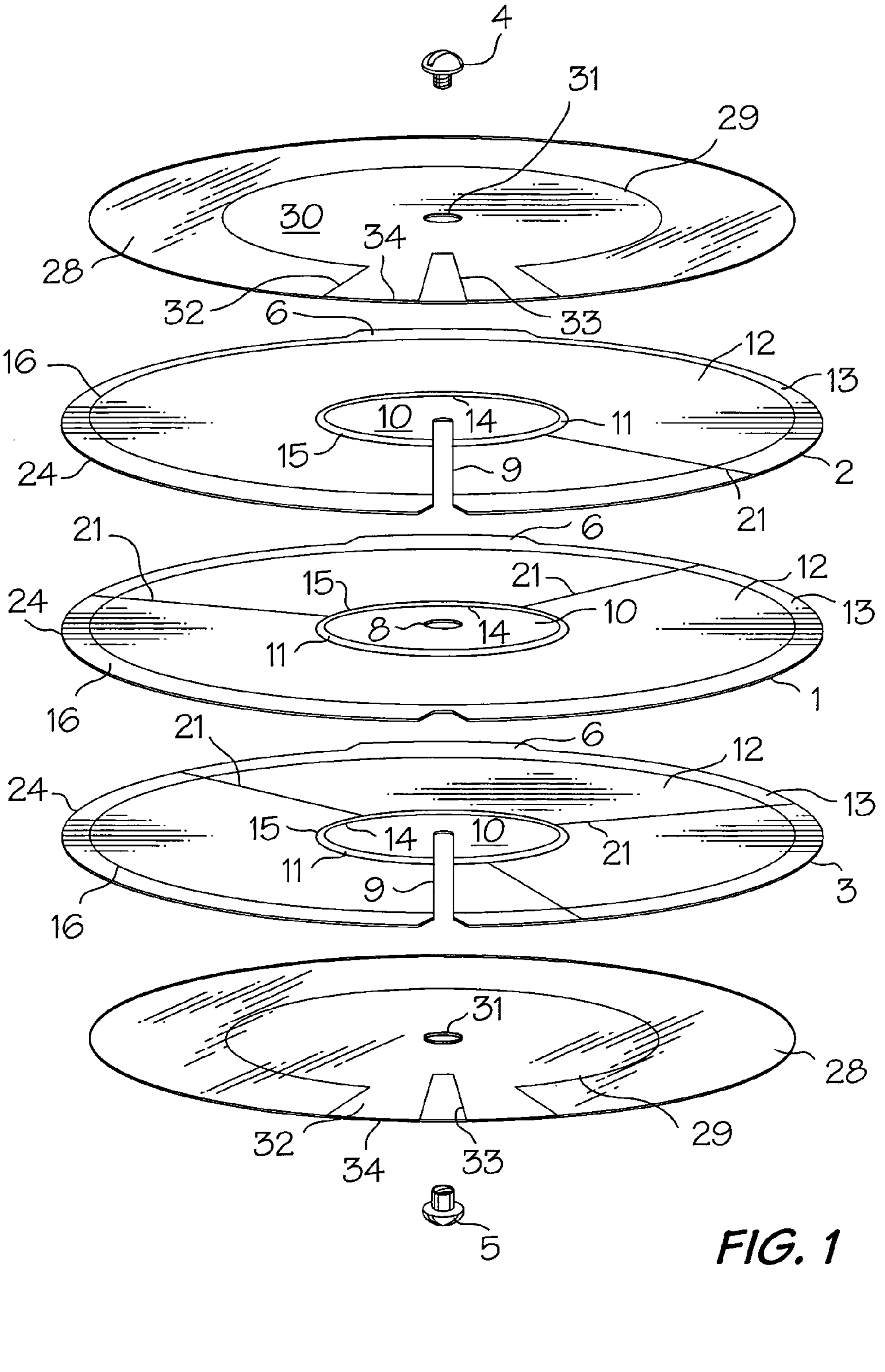
FIG. 1 is a schematic, exploded, isometric view of a nutrition indicator device in accordance with the present invention with parts omitted.
Figure 3:
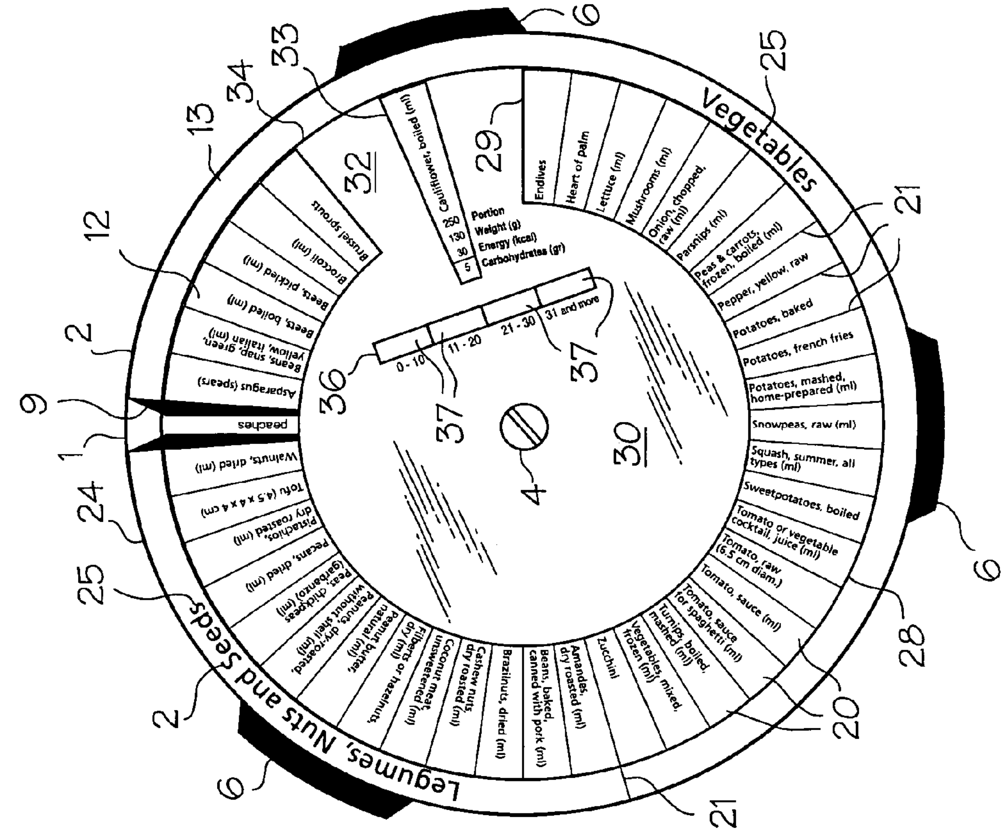
FIG. 3 is a top view of the device of FIG. 1 in the assembled condition.

Referring to FIG. 1, the device of the present invention includes a plurality of indicia bearing discs 1, 2 and 3 rotatably mounted on a pin defined by a bolt 4 and a cylindrical nut 5. Of course, other types of pins can be used to rotatably support the discs 1, 2 and 3. A tab 6 is provided on one side of each of the discs 1, 2 and 3 to facilitate manual rotation of the discs on the nut 5. A hole 8 in the central disc 1 receives the nut 5. Once the device is assembled, the disc 1 remains on the nut 5. A radially extending slot 9 in each of the other two indicia bearing discs 2 and 3 permits the removable mounting of the discs 2 and 3 on the nut 5.

Figure 2:
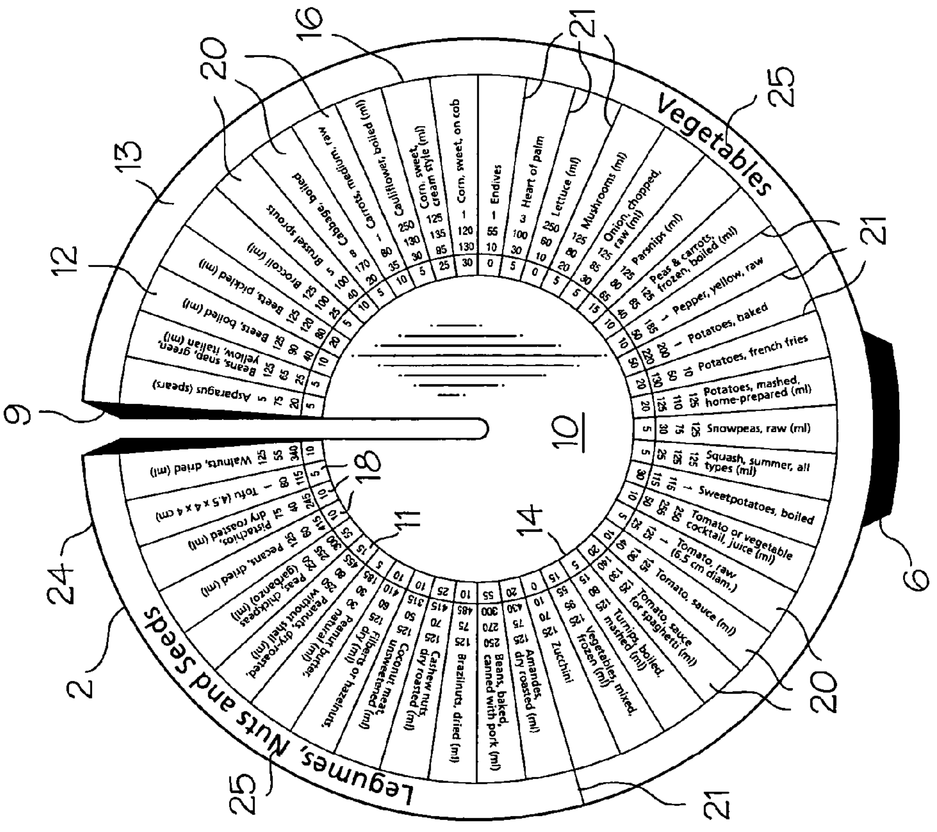
FIG. 2 is a top view of a disc used in the device of FIG. 1.

As best shown in FIG. 2, both sides of all of the discs 1, 2 and 3 are divided into discrete areas 10, 11, 12 and 13 by concentric circles 14, 15 and 16. The central area 10 is blank. An inner annular area 11 bounded by the circles 14 and 15 and the adjacent annular area 12 bounded by circles 15 and 16 are further subdivided into boxes 18 and 20 by a plurality of straight lines 21 extending radially between the circles 14 and 16. The boxes 18 in the area 12 contain indicia in the form of numbers indicative of the carbohydrate content in grams of a food. Moreover, each box 18 is colored with a color selected from the group consisting of blue, yellow, orange and red for the purpose described below. Each of the boxes 20 contains three annular rows of indicia in the form of numbers indicative of the nutritional values of foods, namely the energy content in kilocalories, the weight in grams and the portion, i.e. quantity or volume in ml for which the other values are given, respectively. The rows of indicia are followed radially outwardly by the names of the foods for which the above mentioned nutritional values are given. Thus, each radially extending row contains (1) the name of a food, (2) an inner number indicating the carbohydrate content of the food, (3) the energy content of the food, (4) the weight of the food for which the two values (2) and (3) are given and (5) the portion or volume of the serving of the food for which the nutritional values (2) and (3) are given.

Some of the radially extending lines 21 extend outwardly to the outer peripheral edge 24 of each disc 1, 2 and 3 dividing the outer annular area 13 into arcuate areas containing words 25 identifying the categories of the foods listed in a given section of the disc. The areas 12 between the longer lines 21 containing the names of several foods in one category can be colored, the colors in adjacent such areas being different from each other and from the colors in the carbohydrate boxes 18. The same is true of the arcuate area containing the words 25. In the present case, there are seventeen categories and two hundred and seventy foods listed on the six surfaces of the three discs 1, 2 and 3. The categories and foods are as follows:

FOOD VALUES

| Food | Portion | Weight (g) | Energy (kcal) | Carbohydrate (g) |
|---|---|---|---|---|
| Bread and other bread products | | | | |
| Bagel, plain | 1 | 90 | 245 | 50 |
| Bread, white, commercial | 1 | 25 | 65 | 10 |
| Bread, whole wheat, commercial | 1 | 30 | 70 | 15 |

-continued

| FOOD VALUES | | | | |
|---|---|---|---|---|
| Food | Portion | Weight (g) | Energy (kcal) | Carbohydrate (g) |
| English muffin, plain | 1 | 50 | 135 | 25 |
| Matzos, plain | 1 | 30 | 110 | 25 |
| Pita bread | 1 | 60 | 165 | 35 |
| Roll, dinner, plain | 1 | 60 | 165 | 30 |
| Roll, hamburger or hot dog | 1 | 45 | 125 | 20 |
| Rusk toast (1) / melba (2) | 1-2 | 10 | 40 | 5 |
| **Breakfast cereal** | | | | |
| All Bran | 125 ml | 35 | 90 | 25 |
| Bran Flakes | 175 ml | 35 | 120 | 30 |
| Cherrios | 250 ml | 25 | 100 | 20 |
| Corn Flakes, Kellogg's | 250 ml | 25 | 100 | 25 |
| Cream of wheat, apple-cinnamon | 1 pouch | 160 | 115 | 25 |
| Cream of wheat, regular | 175 ml | 175 | 55 | 10 |
| Frosted Flakes, Kellogg's | 250 ml | 35 | 140 | 35 |
| Granola bars, hard, plain | 1 | 25 | 120 | 15 |
| Granola bars, soft, plain | 1 | 30 | 125 | 20 |
| Harvest crunch, regular, Quaker | 125 ml | 50 | 230 | 30 |
| Just Right, Kellogg's | 250 ml | 45 | 165 | 40 |
| Mini-Wheats, white frosting, Kellogg's | 175 ml | 35 | 120 | 30 |
| Oatmeal, instant, apple-cinnamon | 1 pouch | 185 | 135 | 20 |
| Oatmeal, regular | 175 ml | 145 | 100 | 25 |
| Rice Krispies, Kellogg's | 250 ml | 30 | 110 | 25 |
| Shredded wheat | 1 biscuit | 25 | 90 | 20 |
| Shreddies, Post | 175 ml | 40 | 140 | 30 |
| Special K, Kellogg's | 250 ml | 25 | 90 | 20 |
| **Pasta, rice and other grains** | | | | |
| Pasta, cooked | 250 ml | 160 | 215 | 40 |
| Rice, white, instant, cooked | 250 ml | 175 | 170 | 35 |
| Rice, white, long-grain, cooked | 250 ml | 215 | 280 | 60 |
| **Baked goods** | | | | |
| Angelcake, commercial | 1/12 | 30 | 75 | 15 |
| Apple crisp | 125 ml | 150 | 245 | 50 |
| Cake, carrot, cream cheese icing | 1/12 | 110 | 485 | 50 |
| Cake, chocolate, chocolate icing | 1/10 | 65 | 240 | 35 |
| Cake, chocolate, no icing | 1/12 | 65 | 200 | 30 |
| Cake, pound, commercial | 1/12 | 30 | 110 | 15 |
| Cake, sponge, commercial | 1/12 | 40 | 110 | 25 |
| Cake, white, no icing | 1/12 | 65 | 190 | 34 |
| Cheesecake, cherry topping | 1/12 | 110 | 320 | 30 |
| Coconut macaroons | 1 | 25 | 100 | 15 |
| Cookies, chocolate chip | 2 | 20 | 95 | 15 |
| Cookies, chocolate coated marshmallow | 1 | 15 | 55 | 10 |
| Cookies, chocolate sandwich | 2 | 20 | 95 | 15 |
| Cookies, molasses | 1 | 15 | 65 | 10 |
| Cookies, oatmeal | 1 | 15 | 65 | 10 |
| Cookies, peanut butter | 1 | 15 | 65 | 10 |
| Croissant, butter | 1 | 55 | 200 | 25 |
| Danish pastry, cinnamon (11 cm diam) | 1 | 65 | 260 | 30 |
| Danish pastry, fruit (11 cm diam) | 1 | 70 | 265 | 35 |
| Doughnut, jelly filled | 1 | 85 | 290 | 35 |
| Doughnut, plain (8 cm diam) | 1 | 55 | 200 | 25 |
| Doughnut, plain, chocolate-coated (9 cm diam) | 1 | 55 | 270 | 25 |
| Éclairs, custard filled, chocolat glaze | 1 | 100 | 260 | 25 |
| Fried pie, fruit | 1 | 130 | 400 | 55 |
| Fruitcake, commercial | 1 | 45 | 140 | 15 |
| Muffin, blueberry, commercial | 1 | 70 | 200 | 35 |
| Muffin, bran, from mix | 1 | 50 | 140 | 25 |
| Pancakes, butter-syrup, fast food (17 cm diam) | 1 | 75 | 175 | 30 |
| Pie, apple | 1/8 | 125 | 300 | 40 |
| Pie, cherry, commercial | 1/8 | 125 | 325 | 50 |
| Pie, chocolate cream | 1/6 | 115 | 345 | 40 |
| Pie, coconut cream | 1/6 | 65 | 190 | 25 |
| Pie, lemon meringue | 1/6 | 115 | 300 | 55 |
| Pie, pecan | 1/6 | 115 | 450 | 65 |
| Shortbread, plain | 2 | 15 | 80 | 10 |
| Waffle, plain, frozen, ready-to-heat (10 cm diam) | 1 | 40 | 100 | 15 |
| **Vegetables** | | | | |
| Asparagus (spears) | 5 | 75 | 20 | 5 |
| Beans, snap (green, yellow, italian) | 125 ml | 65 | 25 | 5 |
| Beets, boiled | 125 ml | 90 | 40 | 10 |

-continued

FOOD VALUES

| Food | Portion | Weight (g) | Energy (kcal) | Carbohydrate (g) |
|---|---|---|---|---|
| Beets, pickled | 125 ml | 120 | 80 | 20 |
| Broccoli | 125 ml | 100 | 25 | 5 |
| Brussel sprouts | 5 | 100 | 40 | 10 |
| Cabbage, boiled | 8 | 170 | 20 | 5 |
| Carrots, medium, raw | 1 | 80 | 35 | 10 |
| Cauliflower, boiled | 250 ml | 130 | 30 | 5 |
| Corn, sweet, cream style | 125 ml | 135 | 95 | 25 |
| Corn, sweet, on cob | 1 | 120 | 130 | 30 |
| Endives | 1 | 55 | 10 | 0 |
| Heart of palm | 3 | 100 | 30 | 5 |
| Lettuce | 250 ml | 60 | 10 | 0 |
| Mushrooms | 125 ml | 80 | 20 | 5 |
| Onion, chopped, raw | 125 ml | 85 | 30 | 5 |
| Parsnips | 125 ml | 80 | 65 | 15 |
| Peas & carrots, frozen, boiled | 125 ml | 85 | 40 | 10 |
| Pepper, yellow; raw | 1 | 185 | 50 | 10 |
| Potatoes, baked | 1 | 200 | 220 | 50 |
| Potatoes, french fries | 10 | 50 | 130 | 20 |
| Potatoes, mashed, home-prepared | 125 ml | 110 | 125 | 20 |
| Snowpeas, raw | 125 ml | 75 | 30 | 5 |
| Squash, summer, all types | 125 ml | 125 | 25 | 5 |
| Sweetpotatoes, boiled | 1 | 115 | 115 | 30 |
| Tomato or vegetable cocktail, juice | 250 ml | 255 | 50 | 10 |
| Tomato, raw (6.5 cm diam.) | 1 | 125 | 25 | 5 |
| Tomato, sauce | 125 ml | 130 | 40 | 10 |
| Tomato, sauce for spaghetti | 125 ml | 130 | 140 | 20 |
| Turnips, boiled, mashed | 125 ml | 80 | 15 | 5 |
| Vegetables, mixed, frozen | 125 ml | 95 | 55 | 15 |
| Zucchini | 125 ml | 70 | 10 | 0 |
| Fruits and related products | | | | |
| Apple, orange or grapefruit juice | 250 ml | 265 | 125 | 30 |
| Apple, raw, with skin | 1 | 140 | 80 | 20 |
| Applesauce | 125 ml | 130 | 55 | 15 |
| Apricots, canned | 250 ml | 210 | 135 | 35 |
| Apricots, dried | 60 ml | 35 | 80 | 20 |
| Apricots, raw | 1 | 35 | 15 | 5 |
| Avocado | 1 | 175 | 305 | 10 |
| Banana | 1 | 115 | 105 | 25 |
| Blackberries | 125 ml | 75 | 40 | 10 |
| Blueberries | 125 ml | 75 | 45 | 10 |
| Cantaloup | ½ | 265 | 95 | 20 |
| Cherries, sweets | 10 | 70 | 50 | 10 |
| Dates, dry | 10 | 85 | 230 | 60 |
| Fruits cocktail, canned | 125 ml | 135 | 75 | 20 |
| Grape juice | 250 ml | 265 | 165 | 40 |
| Grapefruit | ½ | 120 | 40 | 10 |
| Grapes, dried | 125 ml | 75 | 230 | 60 |
| Grapes, raw | 10 | 50 | 35 | 10 |
| Honeydew melon | ⅛ | 260 | 90 | 25 |
| Kiwifruit | 1 | 75 | 45 | 10 |
| Mangos | 1 | 205 | 135 | 35 |
| Nectarines | 1 | 135 | 65 | 15 |
| Orange | 1 | 130 | 60 | 15 |
| Peaches | 1 | 85 | 35 | 10 |
| Peaches, canned, juice pack | 125 ml | 130 | 70 | 20 |
| Peaches, canned, water pack | 125 ml | 130 | 60 | 15 |
| Pears, canned, light syrup | 125 ml | 135 | 75 | 20 |
| Pears, raw, with skin | 1 | 170 | 100 | 25 |
| Pineapple, canned, juice pack | 125 ml | 130 | 80 | 20 |
| Pineapple, canned, water pack | 125 ml | 130 | 40 | 10 |
| Pineapple, raw, sliced | 1 slice | 90 | 45 | 10 |
| Plum, raw | 1 | 65 | 35 | 10 |
| Prunes, dried | 10 | 85 | 200 | 55 |
| Raspberries | 125 ml | 65 | 30 | 10 |
| Strawberries | 5 | 60 | 20 | 5 |
| Tangerines (mandarines), raw | 1 | 85 | 35 | 10 |
| Watermelon | ½ slice | 230 | 75 | 15 |
| Dairy Foods and Other Related Products | | | | |
| Brie (5 × 2 × 0.5 cm slice) | 4 | 50 | 175 | 0 |
| Cheddar (5 × 2 × 0.5 cm slice) | 4 | 50 | 210 | 0 |
| Cottage 2% M.F. | 125 ml | 120 | 105 | 5 |
| Cream cheese | 50 ml | 50 | 170 | 0 |
| Half & Half, 10% M.F. | 15 ml | 15 | 20 | 0 |

-continued

FOOD VALUES

| Food | Portion | Weight (g) | Energy (kcal) | Carbohydrate (g) |
|---|---|---|---|---|
| Milk shake, chocolate | 250 ml | 210 | 250 | 45 |
| Milk, chocolate flavour powder (Quik), 2% M.F. | 250 ml | 280 | 210 | 35 |
| Milk, chocolate, 2% M.F. | 250 ml | 265 | 190 | 25 |
| Milk, evaporated, skimmed,undiluted | 250 ml | 270 | 210 | 30 |
| Milk, evaporated, whole, undiluted, 7.8 M.F. | 250 ml | 265 | 365 | 30 |
| Milk, partly skimmed, 2% M.F. | 250 ml | 260 | 130 | 10 |
| Milk, skim | 250 ml | 260 | 90 | 15 |
| Mozzarella, partly skimmed, shredded | 125 ml | 60 | 155 | 0 |
| Parmesan, grated | 125 ml | 55 | 240 | 0 |
| Pudding, instant, prepared with 2% milk | 125 ml | 150 | 150 | 30 |
| Whipping cream, whipped, 35% M.F. | 125 ml | 65 | 205 | 0 |
| Yogourt beverage | 200 ml | 205 | 145 | 30 |
| Yogourt, flavoured (fruit, vanilla, etc), 1.9% M.F. | 175 ml | 175 | 160 | 25 |
| Yogourt, plain, 1-2% M.F. | 175 ml | 175 | 110 | 10 |
| Eggs | | | | |
| Egg, large | 1 | 50 | 80 | 0 |
| Fishs and Shellfishs | | | | |
| Sole, bass, pickerel (fillet) | 1 | 130 | 150 | 0 |
| Cod (fillet) | ½ | 90 | 95 | 0 |
| Halibut, turbot (fillet) | ½ | 160 | 210 | 0 |
| Salmon (fillet) | ½ | 155 | 280 | 0 |
| Trout (fillet) | 1 | 60 | 120 | 0 |
| Shrimp, large | 10 | 55 | 55 | 0 |
| Lobster | 125 ml | 75 | 75 | 0 |
| Oyster, clam and mussel | 125 ml | 85 | 125 | 5 |
| Meat and Poultry | | | | |
| Bacon | 5 | 30 | 180 | 0 |
| Beef, ground, patty | 1 | 70 | 175 | 0 |
| Beef, liver (16.5 × 6 × 1 cm) | 1 | 85 | 185 | 5 |
| Beef, rib steak, lean (11 × 6 × 1 cm) | 1 | 85 | 190 | 0 |
| Beef, stewing, lean | 175 ml | 100 | 195 | 0 |
| Chicken, breast, roasted | ½ | 100 | 155 | 0 |
| Chicken, drumstick, roasted | 1 | 45 | 75 | 0 |
| Creton | 30 ml | 25 | 55 | 0 |
| Ham, lean (16 × 10 × 0.2 cm) | 1 | 70 | 90 | 0 |
| Lamb, ribs, lean | 2 | 90 | 330 | 0 |
| Pork, back ribs, lean and fat | 2 | 70 | 260 | 0 |
| Pork, loin, rib end, lean | 1 | 65 | 165 | 0 |
| Sausage pork-beef | 1 | 70 | 270 | 0 |
| Turkey, breast (8 × 5 × 0.6 cm) | 3 | 85 | 130 | 0 |
| Turkey, dark meat (8 × 5 × 0.6 cm) | 3 | 85 | 155 | 0 |
| Veal, cutlet (7 × 6 × 2 cm) | 1 | 85 | 125 | 0 |
| Weiner, beef | 1 | 40 | 105 | 0 |
| Legumes, Nuts and Seeds | | | | |
| Almonds, dry roasted | 125 ml | 75 | 430 | 20 |
| Beans, baked, canned with pork | 250 ml | 270 | 300 | 55 |
| Brazilnuts, dried | 125 ml | 75 | 485 | 10 |
| Cashew nuts, dry roasted | 125 ml | 70 | 415 | 25 |
| Coconut meat, unsweetened 125 ml | 50 | 315 | 10 | 10 |
| Filberts or hazelnuts, dry | 125 ml | 60 | 410 | 10 |
| Peanut butter, natural | 30 ml | 30 | 185 | 5 |
| Peanuts, dry-roasted, without shell | 250 ml | 80 | 455 | 15 |
| Peas, chickpeas (garbanzo) | 250 ml | 255 | 300 | 55 |
| Pecans, dried | 125 ml | 60 | 415 | 10 |
| Pistachios, dry roasted | 75 ml | 40 | 245 | 10 |
| Tofu (4.5 × 4 × 4 cm) | 1 | 80 | 115 | 5 |
| Walnuts, dried | 125 ml | 55 | 340 | 10 |
| Combination Dishes | | | | |
| Beef pot pie, small | 1 | 200 | 480 | 50 |
| Beef stew | 250 ml | 260 | 180 | 15 |
| Cheeseburger | 1 | 100 | 320 | 30 |
| Chicken pot pie, small | 1 | 200 | 500 | 50 |
| Chicken, breaded and fried, plain | 6 mcx | 100 | 290 | 15 |
| Corndog (Pogo) | 1 | 175 | 460 | 55 |
| Fish, sticks, frozen | 3 | 85 | 225 | 20 |
| Hamburger, double patty + condiments | 1 | 225 | 540 | 40 |
| Hot dog, plain | 1 | 100 | 240 | 20 |
| Macaroni and cheese (Kraft dinner) | 250 ml | 210 | 405 | 50 |
| Nachos with cheese | 8 | 115 | 345 | 35 |

-continued

FOOD VALUES

| Food | Portion | Weight (g) | Energy (kcal) | Carbohydrate (g) |
|---|---|---|---|---|
| Pizza all dressed, medium | ⅛ | 80 | 185 | 20 |
| Pizza with cheese, medium | ⅛ | 65 | 140 | 20 |
| Sandwich, breakfast, with egg and sausage | 1 | 180 | 580 | 40 |
| Sandwich, chicken, plain | 1 | 180 | 515 | 40 |
| Sandwich, fish with tartar sauce | 1 | 160 | 430 | 40 |
| Sandwich, ham, egg and cheese | 1 | 145 | 345 | 30 |
| Sandwich, roast beef, plain | 1 | 140 | 345 | 35 |
| Submarine sandwich with coldcuts | 1 | 230 | 455 | 50 |
| Tourtiere, commercial (20 cm) | ⅙ | 75 | 295 | 20 |
| Soups | | | | |
| Beef broth or bouillon | 285 ml | 290 | 20 | 0 |
| Beef noodle | 250 ml | 260 | 90 | 10 |
| Chicken noodle, chunky | 285 ml | 290 | 210 | 20 |
| Chicken vegetable, chunky | 285 ml | 290 | 200 | 25 |
| Cream of chicken or mushrooms | 250 ml | 260 | 190 | 15 |
| Split pea with ham | 285 ml | 290 | 220 | 30 |
| Vegetable, beef (chunky) | 285 ml | 290 | 145 | 25 |
| Vegetables with beef or minestrone | 250 ml | 255 | 85 | 15 |
| Fats and Oils | | | | |
| Butter | 5 ml | 5 | 35 | 0 |
| Dressing, italian | 15 ml | 15 | 95 | 0 |
| Margarine | 5 ml | 5 | 35 | 0 |
| Oil | 5 ml | 5 | 40 | 0 |
| Sweets and Sugars | | | | |
| Baking chocolate, semi-sweet, chips | 125 ml | 5 | 10 | 5 |
| Brown sugar | 250 ml | 230 | 875 | 225 |
| Butterscotch | 1 | 5 | 25 | 5 |
| Candies, hard | 1 | 5 | 20 | 5 |
| Chocolate covered wafer, bar | 1 | 55 | 270 | 35 |
| chocolate mousse, homemade | 125 ml | 215 | 470 | 35 |
| Chocolate pudding pops | 1 | 45 | 70 | 10 |
| Chocolate syrup, thin type | 15 ml | 20 | 40 | 10 |
| Corn syrup | 15 ml | 20 | 60 | 15 |
| Frozen yogourt, vanilla,soft-serve | 125 ml | 75 | 120 | 20 |
| Fruit leather | 1 | 25 | 80 | 20 |
| Fudge-caramel-nuts, chocolate covered, bar | 1 | 65 | 285 | 45 |
| Honey | 15 ml | 20 | 65 | 20 |
| Jams, marmelade, jelly | 15 ml | 20 | 50 | 15 |
| Jellybeans | 10 | 30 | 105 | 25 |
| Maple syrup | 15 ml | 20 | 50 | 15 |
| Milk chocolate coated peanuts | 10 | 40 | 210 | 20 |
| Milk chocolate coated raisins | 10 | 10 | 40 | 5 |
| Molasses | 15 ml | 20 | 55 | 15 |
| Orange sherbet | 125 ml | 100 | 140 | 30 |
| Popcorn, caramel-coated | 250 ml | 35 | 160 | 30 |
| Sesame crunch (crisp) | 4 | 35 | 180 | 20 |
| Toppings (spread), butterscotch or caramel | 30 ml | 40 | 105 | 25 |
| Vanilla ice cream | 125 ml | 70 | 140 | 15 |
| White sugar | 15 ml | 15 | 50 | 15 |
| Snacks | | | | |
| Crackers, standard-type (Ritz) | 8 | 25 | 120 | 15 |
| Crackers, whole wheat | 4 | 15 | 70 | 10 |
| Popcorn, air-popped | 250 ml | 10 | 30 | 5 |
| Popcorn, cheese flavoured | 250 ml | 10 | 60 | 5 |
| Popcorn, oil-popped | 250 ml | 15 | 75 | 10 |
| Potato chips | 10 | 20 | 110 | 10 |
| Rice cakes | 1 | 10 | 35 | 5 |
| Saltines (oyster, soda, soup) | 4 | 10 | 50 | 10 |
| Beverages | | | | |
| Beer, regular (5% alcohol by volume) | 1 | 340 | 150 | 15 |
| Soft drinks, cola | 250 ml | 260 | 105 | 25 |
| Spirits (gin, whiskey, etc) | 50 ml | 45 | 115 | 0 |
| Wine, dessert, sweet | 125 ml | 125 | 195 | 15 |
| Wine, table | 125 ml | 125 | 85 | 1 |
| Miscellaneous Items | | | | |
| Ketchup | 15 ml | 15 | 15 | 5 |
| Olives, large | 4 | 20 | 20 | 0 |
| Relish | 15 ml | 15 | 20 | 5 |
| Sauce, white, home prepared, 2% milk | 250 ml | 265 | 390 | 25 |

-continued

| FOOD VALUES | | | | |
|---|---|---|---|---|
| Food | Portion | Weight (g) | Energy (kcal) | Carbohydrate (g) |
| Sauces, barbecue | 15 ml | 15 | 10 | 0 |
| Shake'n Bake, dry | 125 ml | 50 | 1900 | 30 |
| Vinegar | 15 ml | 15 | 0 | 0 |

The device is symmetrical, including three discs. By turning the device over the top side becomes the bottom side and vice versa. Either of the discs 2 and 3 can be slide out of the device and rotated so that the bottom side becomes the top side and vice versa, or both discs 2 and 3 can be removed so that both sides of the center disc 1 are visible to the user.

As mentioned above, the slots 9 in the discs 2 and 3 permit removal of such discs. While they are not necessary to the function of the device, transparent, protective circular covers 28 are permanently mounted on the nut 5 above the disc 2 and below the disc 3. Each cover 28 includes a mask 29, which can be an opaque material, e.g. a piece of paper glued onto the disc or a dark color such as black printed onto the cover 28. In the absence of a cover 28, the masks would be separate elements mounted on the pin. The mask 29 includes a circular center section 30 of sufficient diameter to cover or mask all of the nutritional values represented by the carbohydrate numbers and the annular rows of numbers in the boxes 20. A hole 31 in the center of the section 30 receives the nut 5. An arm 32 extends radially outwardly from one side of the central section 30 of the mask 29 to the outer edge of the cover 28. The arm 32 is sufficiently wide to cover several radial rows of the names of foods (in this case five rows). A deep notch 33 extends radially inwardly from the outer edge 34 of the arm 32 towards the center of the cover. The notch 33 defines a window, which is sufficiently deep that when aligned with one of the food names in a box 20 on one of the discs 1, 2 or 3, one of the numbers in the boxes 18, one set of three numbers in the food name box 20 and the one food name are visible to the user of the device. A bar 36 defining a color legend radially inwardly of the notch 33 on the circular center section of the mask 29 is divided into four color coded sections 37 with numbers adjacent to the sections on the mask 29. The end section 37 with the lowest numbers is colored blue, the next adjacent section is colored yellow, the next section is colored orange and the last, end section is colored red. As mentioned above, one of the colors also appears in each of the boxes 18. The colors provide an indication of the carbohydrate content of the food, blue being low and red being very high for the given quantities. The numbers adjacent to the bar are indicative of the weight ranges of carbohydrates corresponding to the colors in the sections of the bar, e.g. "0 to 10" adjacent blue indicates that there are up to 10 grams of carbohydrates and "31 and more" adjacent to the red section indicates that there are 31 or more grams of carbohydrates.

As mentioned above, the clear plastic covers 28 are not strictly essential to the operation of the device. The masks 29 can be separate, opaque elements. However, the presence of the covers 28 makes it easier to rotate the discs 1, 2 or 3 while keeping the mask 29 in one position. It is merely necessary that the discs 1, 2 and 3, and the mask 29 can be rotated relative to each other for aligning one of the food names with the notches 33 in the masks. The mask 29 could be rotated and the discs 1, 2 and 3 could remain stationary. However, with a view to making the device as compact as possible, only three discs are used, two of them being removable which is why the inventor decided to make the discs rotatable. Moreover, without departing from the essence of the invention, it is possible to provide a stack of discs with a mask and window on only the top of the stack, in which case all but the bottom disc in the stock would be removable. However, the form of the invention described in detail in the foregoing is believed to be the simplest and best.

The invention claimed is:

1. A nutrition indicator device comprising a pin; a plurality of discs on said pin, said discs having two sides, each of said sides having the names of foods and nutritional information for each of the foods, each food name being radially aligned with the nutritional information, the nutritional information being arranged in a plurality of concentric annular rows nearest the center of the disc, and the names of the foods being arranged in a first annular area externally of and concentric with said annular rows; a radially extending slot in at least some of said discs permitting removal of selected of said discs from the pin, whereby the food names and nutritional information on a disc beneath a removed disc can be viewed; a circular, opaque mask for covering only the nutritional information in said annular rows; an arm extending radially outwardly from said mask for covering a plurality of food names, a window extending radially of said arm a distance sufficient to expose only one food name and the nutritional information with respect to said one food, whereby, when a disc immediately beneath said mask is rotated relative to the mask, the name and nutritional information of only one food appears in said window.

2. The nutrition indicator device of claim 1 including tabs extending radially outwardly from each said disc facilitating manual rotation and removal of said discs.

3. The nutrition indicator device of claim 1 including a second annular area externally of and concentric with said first annular area, and the names of food groups in said second annular area spanning the outer ends of a plurality of food names.

4. The nutrition indicator device of claim 3, including annular lines dividing the two sides of each disc into an empty circular central area, an inner annular row containing key nutritional information; an intermediate annular area containing the remaining annular rows of nutritional information and the names of foods, and an outer annular area containing the names of food groups.

5. The nutrition indicator device of claim 4, including a plurality of straight lines extending radially on each side of each disc between said central area and said outer annular area, said straight lines defining boxes with said annular lines, said boxes containing one food name and nutritional information with respect to said one food name.

6. The nutrition indicator device of claim 5, wherein each box in the inner annular row containing key nutritional information contains one of a plurality of colors, which provide an easily recognizable indication of the nutritional value of the foods named on the discs.

7. The nutrition indicator device of claim 6, including a color legend on said mask containing the same colors as said boxes in said inner annular row, and numbers on said mask adjacent to said color legend indicative of the nutritional values associated with said colors, the numbers and colors providing a simple indication of the relative merits of a food with respect to said key nutritional information.

8. The nutrition indicator device of claim 1 including masks and arms above and below the plurality of discs, whereby the device can be turned over to selectively display nutritional information on either side thereof.

9. The nutrition indicator device of claim 8, including a clear cover on said pin above and below the plurality of discs for protecting the discs.

10. The nutrition indicator device of claim 9, wherein each mask and arm are part of one said cover.

* * * * *